US011864282B2

(12) United States Patent
Suyama et al.

(10) Patent No.: US 11,864,282 B2

(45) Date of Patent: Jan. 2, 2024

(54) LIGHT-EMITTING ELEMENT DRIVING DEVICE

(71) Applicant: ROHM CO., LTD., Kyoto (JP)

(72) Inventors: Makoto Suyama, Kyoto (JP); Koji Katsura, Kyoto (JP); Toshiro Okubo, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 35 days.

(21) Appl. No.: 17/891,311

(22) Filed: Aug. 19, 2022

(65) Prior Publication Data

US 2023/0090191 A1 Mar. 23, 2023

(30) Foreign Application Priority Data

Sep. 16, 2021 (JP) ................................ 2021-150863

(51) Int. Cl.

| | |
|---|---|
| ***H05B 45/14*** | (2020.01) |
| ***H05B 45/345*** | (2020.01) |
| ***H05B 45/50*** | (2022.01) |
| ***H05B 45/46*** | (2020.01) |

(52) U.S. Cl.

CPC ........... *H05B 45/14* (2020.01); *H05B 45/345* (2020.01); *H05B 45/46* (2020.01); *H05B 45/50* (2020.01)

(58) Field of Classification Search

CPC ........ H05B 47/10; H05B 45/10; H05B 45/14; H05B 45/345; H05B 45/46; H05B 45/50

See application file for complete search history.

(56) References Cited

U.S. PATENT DOCUMENTS

2010/0219773 A1* 9/2010 Nakai .................... H05B 45/46 315/307

2021/0016706 A1* 1/2021 Ichikawa ............. H05B 45/375

FOREIGN PATENT DOCUMENTS

JP 2013-21117 1/2013

* cited by examiner

*Primary Examiner* — Jimmy T Vu

(74) *Attorney, Agent, or Firm* — Fish & Richardson P.C.

(57) ABSTRACT

The present disclosure provides a light emitting element driving device. The light emitting element driving device includes a constant current circuit and a current detection unit. The constant current circuit includes: a first transistor including a first end, a second end and a control end connected to an external terminal; a current setting resistance connected to the second end of the first transistor; and a drive amplifier including a first input end connected to a first node to which the first transistor and the current setting resistance are connected, a second input end to which a current set voltage is applied, and an output end connected to the control end of the first transistor. The current detection unit generates a current detection signal based on a feedback voltage generated in the first node.

20 Claims, 5 Drawing Sheets

LIGHT-EMITTING ELEMENT DRIVING DEVICE

TECHNICAL FIELD

The present disclosure relates to a light emitting element driving device.

BACKGROUND

Conventionally, a light emitting diode (LED) is known as an example of a light emitting element. LEDs, featuring small power consumption and long durability, are applied for various uses. Patent document 1 discloses a conventional example of an LED driving device that drives an LED.

The LED driving device of patent document 1 includes an LED terminal configured to connect to a cathode of an LED, and a constant current driver connected to the LED terminal. With the constant current driver, an LED current serving as a constant current flows through the LED.

Moreover, the LED driving device of patent document 1 provides abnormality detection functions such as detecting an open circuit and grounding of the LED terminal based on voltage of the LED terminal.

PRIOR ART DOCUMENT

Patent Publication

[Patent document 1] Japan Patent Publication No. 2013-21117

SUMMARY OF THE PRESENT DISCLOSURE

Problems to be Solved by the Disclosure

Recently, for the LED driving device described above, there is a requirement of being capable of monitoring whether a current set in the constant current driver flows normally. In the LED driving device of patent document 1 is provided with the abnormality detection function above. However, because the voltage at the LED terminal may be falsely detected as a state of current flowing through the constant current driver, a current flowing through the constant current driver cannot be directly monitored.

In view of the situation above, it is an object of the present disclosure to provide a light emitting element driver device capable of directly monitoring a current flowing through a constant current circuit driving a light emitting element.

Technical Means for Solving the Problem

For example, a light emitting element driving device of the present disclosure is configured to include: an external terminal, configured to connect to a first terminal of a light emitting element; a constant current circuit, connected to the external terminal; and a current detection unit, configured to detect a current flowing through the constant current circuit. The constant current circuit includes: a first transistor, including a first end, a second end and a control end connected to the external terminal; a current setting resistance, connected to the second end of the first transistor; and a drive amplifier, including a first input end connected to a first node to which the first transistor and the current setting resistance are connected, a second input end to which a current set voltage is applied, and an output end connected to the control end of the first transistor. The current detection unit converts the current flowing through the light emitting element into a voltage signal based on a feedback voltage generated in the first node, and generates a current detection signal.

Effects of the Disclosure

The light emitting element driver device according to the present disclosure is capable of directly monitoring a current flowing through a constant current circuit driving a light emitting element.

DETAILED DESCRIPTION OF THE EMBODIMENTS

<1. Configuration of Light Emitting Diode (LED) Driving Device>

Figure 1:
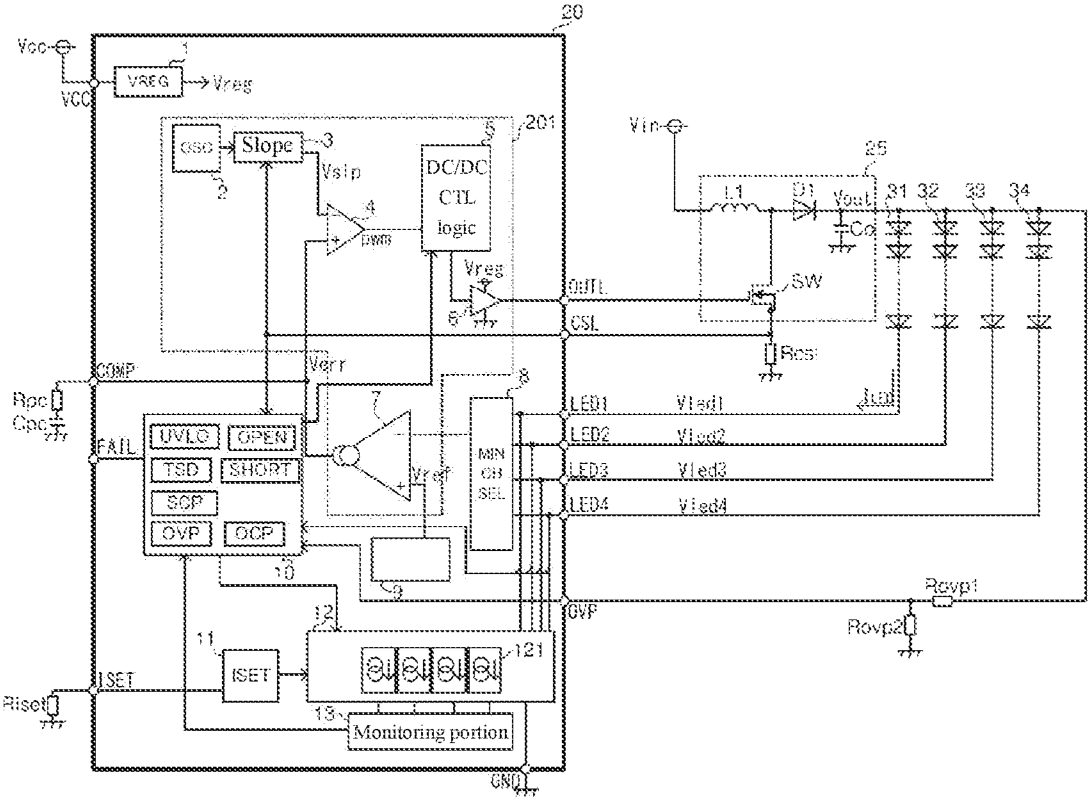
FIG. 1 is a diagram of a configuration of a light emitting diode (LED) driving device according to an exemplary embodiment.

FIG. 1 shows a diagram of a configuration of a light emitting diode (LED) driving device 20 according to an exemplary embodiment. The LED driving device 20 in FIG. 1 drives LED arrays 31 to 34 of multiple systems (for example, four systems in this embodiment).

The LED driving device 20 is integrated as a semiconductor device including an internal voltage generating unit 1, an oscillation unit 2, a slope generating unit 3, a pulse width modulation (PWM) comparator 4, a direct-current/direct-current (DC/DC) control logic unit 5, a driver 6, an error amplifier 7, a selector 8, a reference voltage generating unit 9, a protection circuit unit 10, an LED current setting unit 11, a constant current driver 12, and a current monitoring unit 13.

Moreover, for establishing external electrical connections, the LED driving device 20 includes external terminals including a terminal VCC (voltage coefficient of capacitance), an OUTL terminal, a CSL (control signal line) terminal, terminals LED1 to LED4, OVP (overvoltage protection) terminal, a GND (ground) terminal, an ISET terminal, a FAIL (fail) terminal, and a COMP (coordinated multiple transmission) terminal.

On the outside of the LED driving device 20, an output section 25 is provided to generate an output voltage Vout converted from an input voltage Vin by DC/DC conversion and to supply the output voltage Vout to anodes of LED arrays 31 to 34. The output section 25 includes a switch element SW, a diode D1, an inductor L1 and an output capacitor Co. By means of driving and controlling the switch element SW by the LED driving device 20, the output section 25 is controlled by the LED driving device 20. A DC/DC converter is formed by the output section 25 and the LED driving device 20. Moreover, in this embodiment, a boost DC/DC converter in particular is formed as a DC/DC converter.

An application end of the input voltage Vin is connected to one end of the inductor L1. The other end of the inductor L1 is connected to the anode of the diode D1 and the drain of the switch element SW implemented by an n-channel metal-oxide-semiconductor field-effect transistor (MOSFET). The source of the switch element SW is connected to a ground terminal via a current detection resistor Rsc1. The gate of the switch element SW is connected to the terminal OUT. The cathode of the diode D1 is connected to one end of the output capacitor Co. The other end of the output capacitor Co is connected to the ground terminal. The output voltage Vout is generated on one end of the output capacitor Co.

Moreover, the switch element SW may also be included in the LED driving device 20.

The anodes of the LED arrays 31 to 34 are connected to one end of the output capacitor Co that generates the output voltage Vout. The LED arrays 31 to 34 are each formed by multiple LEDs connected in series. The cathodes of the LED arrays 31 to 34 are connected to the terminals LED1 to LED4, respectively.

Moreover, each the LED arrays 31 to 34 is not limited to being in a series connection, and may also be formed by LEDs connected in series and in parallel, or may be formed by only one LED. Moreover, the number (system number) of LED arrays that can be driven is not limited to being four, and may be, for example, six. Moreover, the number of LED systems that can be driven may be one.

The internal configuration of the LED driving device 20 is to be described below.

The internal voltage generating unit 1 generates and outputs an internal voltage Vreg (for example, 5 V) from a power supply voltage Vcc applied to the terminal VCC. The internal voltage Vreg is used as a power supply voltage for internal circuits of the LED driving device 20. Moreover, the internal voltage Vreg may also be output to the outside from a terminal REG serving as an external terminal.

The oscillation unit 2 generates and outputs a predetermined clock signal to the slope generating unit 3.

The slope generating unit 3 generates a slope signal (triangular-wave signal) Vslp based on the clock signal input from the oscillation unit 2, and outputs the slope signal Vslp to the PWM comparator 4. Moreover, the slope generating unit 3 has a function of shifting the slope signal Vslp according to the CSL terminal voltage by means of converting a current flowing through the switch element SW by the current detection resistor Rcs1.

The PWM comparator 4 compares an error signal Verr input to a non-inverting end (+1) and the slope signal Vslp input to an inverting end (−) to generate an internal PWM signal pwm, and outputs the internal PWM signal pwm to the DC/DC control logic unit 5.

The DC/DC control logic unit 5 generates a driving signal of the driver 5 based on the internal PWM signal pwm.

The driver 6 generates, according to the driving signal input from the DC/DC logic control unit 5, a gate voltage of the switch element SW in pulse form between the internal voltage Vreg and the ground voltage.

The switch element SW is turned on/off based on the gate voltage input from the driver 6.

LED terminal voltages Vled1 to Vled4 are applied to the terminals LED1 to LED4, respectively, as respective cathode voltages of the LED arrays 31 to 34. The selector 8 selects and outputs a lowest voltage from the LED terminal voltages Vled1 to Vled4 to an inverting end (−) of the error amplifier 7.

A reference voltage Vref generated by the reference voltage generating unit 9 is applied to a non-inverting end (+) of the error amplifier 7. The error amplifier 7 outputs an error amplifier output current (a source current or a reverse current) corresponding to a difference between the lowest voltage applied to the inverting end (−) and the reference voltage Vref.

An output terminal of the error amplifier 7 is connected to the terminal COMP. The terminal COMP is connected to the ground terminal via a phase compensation resistor Rpc and a capacitor Cpc that are externally connected in series. The error voltage Verr is generated at the terminal COMP. The error voltage Verr is applied to the non-inverting end (+) of the PWM comparator 4.

The protection circuit unit 10 includes a TSD (thermal shut down) unit, an OCP (open-circuit potential) unit, an OVP unit, an LED open-circuit detection circuit (OPEN), an LED short-circuit detection circuit (SHORT), an output short-circuit protection circuit (security control processor, SCP), and an UVLO (under-voltage lock out) unit.

When the junction temperature of the LED driving device 20 is, for example, 175° C. or above, the TSD unit instructs the DC/DC control logic unit 5 to turn off the DC/DC switch, and instructs the constant current driver 12 to turn off all the LED systems. Moreover, when the junction temperature of the LED driving device 20 is, for example, 150° C., the TSD unit resumes powering.

The OCP unit monitors the CSL terminal voltage (an input current detection voltage) which is detected by the current detection resistor Rcs by using the current flowing through the switch element SW as a voltage signal, and applies an over-current protection when the CSL terminal voltage is, for example, 0.3 V or more. The OCP unit instructs the DC/DC control logic unit 5 to turn off the DC/DC switch while it applies the over-current protection.

The OVP unit monitors an OVP terminal voltage, and applies an over-voltage protection when the OVP terminal voltage becomes, for example, 1.21 V or more. The OVP unit instructs the DC/DC control logic unit 5 to turn off the DC/DC switch while it applies the over-voltage protection.

The LED open-circuit detection circuit (OPEN) detects an open-circuit abnormality of the terminals LED1 to LED4. In the LED open-circuit detection circuit, an undercurrent condition is detected by the current monitoring unit 13 to be described later, and when the OVP terminal voltage becomes, for example, 1.21 V or more, LED open-circuit detection is applied and only the LED array having undergone the open-circuit detection is latched and turned off (setting the constant current circuit 121 of the corresponding system in the constant current driver 12 to be off).

In the LED short-circuit detection circuit (SHORT), when any of the LED terminal voltages Vled1 to Vled4 is, for example, 0.5 V or more, a built-in counter starts to operate, latch is applied after approximately 3.56 ms has lapsed, and only the LED array having undergone the short-circuit detection is latched and turned off (setting the constant current circuit 121 of the corresponding system in the constant current driver 12 to be off).

In the output short-circuit protection circuit (SCP), when an OPV terminal voltage becomes, for example, 0.1 V or less, a built-in counter starts to operate, latch is applied after approximately 3.56 ms has lapsed, the DC/DC control logic unit 5 is instructed to turn off the DC/DC switch, and the constant current driver 12 is instructed to turn off all the LED systems. Accordingly, the output short-circuit protection circuit is capable of applying a protection when the anode sides (the DC/DC output terminal side) of the LED arrays 31 to 34 are grounded.

Moreover, in the output short-circuit protection circuit, by detecting an undercurrent abnormality by the current monitoring unit 13 to be described later, when the OPV terminal voltage becomes, for example, 1.21 V or less, the built-in counter starts to operate, latch is applied after approximately 3.56 ms has lapsed, the DC/DC control logic unit 5 is instructed to turn off the DC/DC switch, and the constant current driver 12 is instructed to turn off all the LED systems. Accordingly, the output short-circuit protection circuit is capable of applying a protection when the cathode sides of the LED arrays 31 to 34 are grounded.

When the power supply voltage Vcc is, for example, 4.1 V or less, or when the internal voltage Vref is, for example, 4.0 V or less, the UVLO unit instructs the DC/DC control logic unit 5 to turn off the DC/DC switch, and instructs the constant current driver 12 to turn off all the LED systems.

The protection circuit unit 10 outputs an abnormality detection signal from the terminal FAIL to the outside according to the abnormality detection states of the LED open-circuit detection circuit, the LED short-circuit detection circuit and the output short-circuit protection circuit (SCP). The terminal FAIL is configured as an open-circuit drain.

The LED current setting unit 11 sets, at the constant current driver 12, a constant current value corresponding to a resistance value of a LED current setting resistor Riset externally connected to a terminal ISET (a current setting terminal). Moreover, specific configuration details of the LED current setting unit 11 are to be described later.

The constant current driver 12 includes a constant current circuit 121 arranged between each of the terminals LED1 to LED4 and the terminal GND connected to the ground terminal for an amount of four systems. With the constant current circuit 121, an LED current $I_{LED}$ in a constant current value set by the LED current setting unit 11 flows through the LED arrays 31 to 34 of the corresponding systems. Moreover, as to be described later, the constant current value set by the LED current setting unit 11 is set to be variable, so as to perform DC dimming tuning for LEDs. Moreover, a PWM dimming function that controls turning on/off of the constant current circuit 121 based on a PWM dimming signal can also be provided.

The current monitoring unit 13 is a circuit that monitors a current flowing through the constant current circuit 121 of each system and outputs a monitoring result to the protection circuit unit 10. Moreover, specific configuration details of the constant current circuit 121 and the current monitoring unit 13 are to be described later.

<2. DC/DC Controller>

Next, the DC/DC controller 201 (a circuit block including the oscillation unit 2, the slope generating unit 3, the PWM comparator 4, the DC/DC control logic unit 5, the driver 6 and the error amplifier 7) included in the LED driving device 20 is to be described in detail below.

The error amplifier 7 generates an error amplifier output current according to the difference between the lowest value among the LED terminal voltages Vled1 to Vled4 selected by the selector 8 and the reference voltage Vref. The error amplifier output current becomes a source current when the lowest voltage is lower than the reference voltage Vref, and becomes a reverse current when the lowest voltage is higher than the reference voltage Vref.

The PWM comparator 4 compares the error voltage Verr with the slope signal Vslp to generate the internal PWM signal pwm. In the internal PWM signal pwm is at a high level if the error voltage Verr is higher than the slope signal Vslp, and is at a low level if the error voltage Verr is lower than the slope signal Vslp.

The control logic unit 5 turns on/off the switch element SW based on the internal PWM signal pwm. Specifically speaking, the control logic unit 5 turns on the switch element SW when the internal PWM signal pwm is at a high level. Conversely, the control logic unit 5 turns off the switch element SW when the internal PWM signal pwm is at a low level.

Accordingly, a feedback control unit including the error amplifier 7, the PWM comparator 4, the logic control unit 5 and the driver 6 performs feedback control of outputting a switch pulse from the terminal OUTL to the switch element SW in order to have the lowest value among the LED terminal voltages Vled1 to Vled4 be consistent with the reference voltage Vref. That is to say, the DC/DC controller 201 includes the feedback control unit.

When the switch element SW is turned on, a current flows through a path from an application end of the input voltage Vin through the switch element SW to the ground terminal, and energy is stored in the inductor L1. At this point, the diode D1 becomes a reverse biased state, and so the current does not flow from the output capacitor Co to the switch element SW. When electric charge is stored in the capacitor Co, the LED current $I_{LED}$ flows from the output capacitor Co to the anodes of the LED arrays 31 to 34.

When the switch element SW is turned off, energy stored in the inductor L1 is released, and the current serving as the LED current $I_{LED}$ flows into the LED arrays 31 to 34, and also flows into the output capacitor Co to charge the output capacitor Co.

By repeating the operation above, the output voltage Vout obtained by boosting the input voltage Vin is supplied to the anodes of the LED arrays 31 to 34. At this point, the cathode voltage of the LED array with the largest forward voltage is controlled as the reference voltage Vref, and the cathode voltages of the remaining LED arrays are controlled as voltages above the reference voltage Vref <3. Current Monitoring Unit of First Embodiment>

Figure 2:
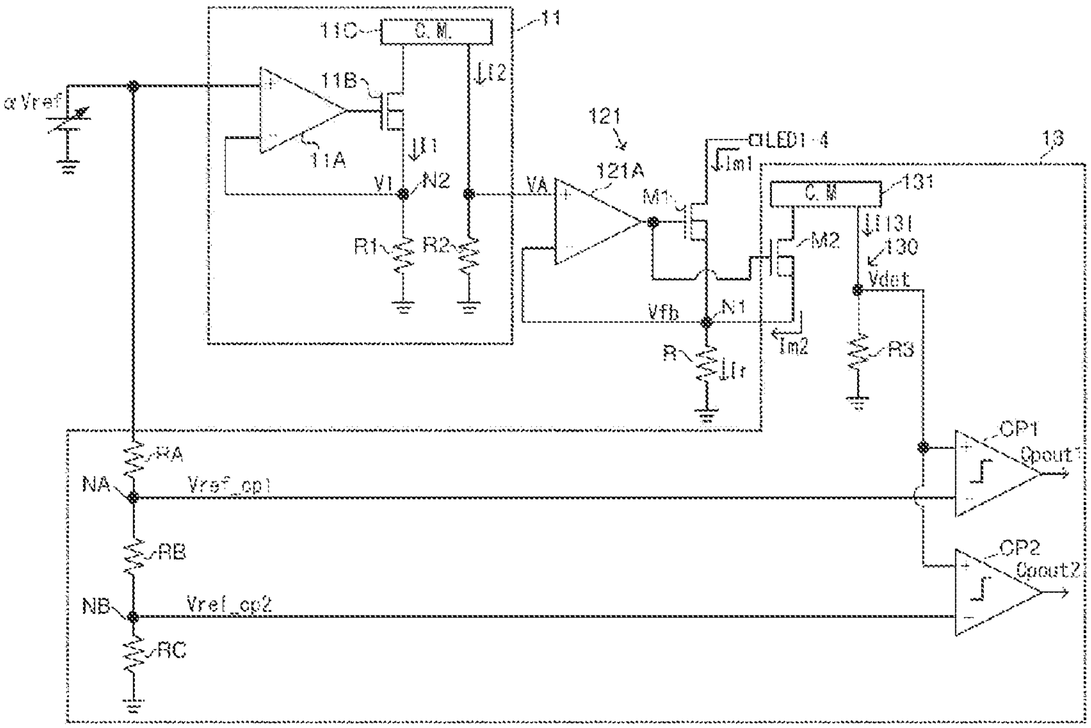
FIG. 2 is a circuit diagram of a configuration including a current monitoring unit according to a first embodiment.

Next, more specific details of the constant current circuit 121 and the current monitoring unit 13 are given below. FIG. 2 shows a circuit diagram of a configuration example of the constant current circuit 121 and the current monitoring unit 13. The current monitoring unit 13 shown in FIG. 2 is the current monitoring unit 13 of the first embodiment. Moreover, the configuration of the LED current setting unit 11 is also shown in FIG. 2.

The configuration in FIG. 2 representatively shows the configuration corresponding to the LED corresponding to one system, and the configuration in FIG. 2 in fact is provided for an amount of systems provided (the example in FIG. 1 contains an amount of four system). However, the LED current setting unit 11 and voltage dividing resistors RA, RB and RC to be described later can also be common between the LED systems.

As shown in FIG. 2, the constant current circuit 12 includes a drive amplifier (an error amplifier) 121A, a transistor M1 and a current setting resistor R. A current set reference voltage VA is applied to a non-inverting end (+) of the drive amplifier 121A. An output end of the drive amplifier 121A is connected to the gate of the transistor M1 implemented by an N-type metal-oxide-semiconductor (NMOS) transistor (N channel MOSFET). The drain of the transistor M1 is connected to the LED terminal (any among the terminals LED1 to LED4). The source of the transistor M1 is connected to one end of a current setting resistance R via a node N1. The other end of the current setting resistance R is connected to the ground terminal. The node N1 is connected to an inverting end (−) of the drive amplifier 121A.

The drive amplifier 121A amplifies and outputs an error between the current set reference voltage VA and a feedback voltage Vfb generated in the node N1 to the gate of the transistor M1. Accordingly, it is controlled that the feedback voltage V fb is equal to the current set reference voltage VA.

As shown in FIG. 2, the current monitoring unit 13 includes a current detection unit 130. The current detection unit 130 is configured to detect a current Im1 flowing through the transistor M1.

The current detection unit 130 includes a transistor M2, a current mirror 131 and an I-V (current-voltage) conversion resistor R3. The gate of the transistor M2 implemented by an NMOS transistor is connected to an output end of the drive amplifier 121A. The source of the transistor M2 is connected to the node N1. The drain of the transistor M2 is connected to an input end of the current mirror 131. An output end of the current mirror 131 is connected to one end of the I-V conversion resistor R3. The other end of the I-V conversion resistor R is connected to the ground terminal.

In the constant current circuit 121, with the feedback voltage Vfb generated in the node N1 and the current setting resistance R, a current Ir=Vfb/R flows through the current setting resistance R. The current Ir is a combined current of the current Im1 to flow through the transistor M1 and a current Im2 to flow through the transistor M2. Moreover, in a normal condition, the current Im1 is equal to the LED current $I_{LED}$.

If the sizes of the transistor M1 and the transistor M2 are set to be M1:M2, the currents Im1 and Im2 are respectively represented as below.

$$\mathrm{Im1}=Ir\times(M1/(M1+M2))=(Vfb/R)\times(M1/(M1+M2)$$

$$\mathrm{Im2}=Ir\times(M2/(M1+M2))=(Vfb/R)\times(M2/(M1+M2)$$

An output current I131 output from the current mirror 131 to the I-V conversion resistor R3 is I131, which is equal to the current Im2. Thus, the current detection signal Vdet obtained by performing I-V conversion on the output current I131 using the I-V conversion resistor R3 is represented as below.

$$V\,\mathrm{det}=I131\times R3=\mathrm{Im2}\times R3=(Vfb/R)\times(M2/(M1+M2))\times R3$$

That is to say, because the current Im1 flowing through the transistor M1 is detected by the current Im2 flowing through the transistor M2 based on the feedback voltage Vfb, and the current detection signal Vdet is obtained by performing I-V conversion on the current Im2 with the current mirror 131 and the I-V conversion resistor R3, the current Im1 flowing through the constant current circuit 121 is directly monitored through the current detection signal Vdet. Moreover, the size of the transistor M2 can be designed to be less than the size of the transistor M1, hence reducing the current Im2.

The current set reference voltage VA is generated by the LED current setting unit 11. The LED current setting unit 11 includes an error amplifier 11A, a transistor 11B, a current mirror 11C, and resistors R1 and R2.

A reference voltage αVref is applied to a non-inverting end (+) of the error amplifier 11A. Moreover, the reference voltage (αVref) is variable. An output terminal of the error amplifier 11A is connected to the gate of the transistor 11B implemented by an NMOS transistor. The source of the transistor 11B is connected to one end of the resistor R1 via a node N2. The other end of the resistor R1 is connected to the ground terminal. The node N2 is connected to an inverting end (−) of the error amplifier 11A.

The drain of the transistor 11B is connected to an input end of the current mirror 11C. An output end of the current mirror 11C is connected to one end the resistor R2. The other end of the resistor R2 is connected to the ground terminal.

A feedback voltage V1 generated in the node N2 is controlled to be equal to the reference voltage αVref. Accordingly, a current I1 flowing through the resistor R1 becomes I1=V1/R1=αVref/R1. Since a current I2 flowing from the current mirror 11C to the resistor R2 is equal to I1, the current set reference voltage VA obtained by performing I-V conversion on the current I2 through the resistor R2 is as below.

$$VA=I2\times R2=I1\times R2=(\alpha\mathrm{Vref}/R1)\times R2$$

In the constant current circuit, because the feedback voltage Vfb is controlled to be equal to the current set reference voltage VA, the current Im1 flowing through the transistor M1 is as below.

$$\mathrm{Im1}=(VA/R)\times(M1/(M1+M2))$$

By setting the reference voltage αVref to be variable, the current set reference voltage VA becomes variable, and the current Im1, that is, the LED current $I_{LED}$ is also set to be variable, thereby performing DC dimming of LEDs. Moreover, the resistor R1 is equivalent to the LED current setting resistor Riset (FIG. 1) externally connected to the terminal ISET. Thus, the value of the current set reference voltage VA can be set through the LED current setting resistor Riset. Moreover, by trimming the resistor R2, even if an offset is generated in the reference voltage αVref, the current set reference voltage VA can still be set to an expected value.

Because the feedback voltage Vfb is controlled to be equal to the current set reference voltage VA, the current detection signal Vdet is as below.

$$V\,\mathrm{det}=(Vfb/R)\times(M2/(M1+M2))\times R3=(VA/R)\times(M2/(M1+M2))xR3=(((\alpha\mathrm{Vref}/R1)\times R2)/R)\times(M2/(M1+M2))\times R3$$

Moreover, as shown in FIG. 2, the current monitoring unit 13 includes window comparators CP1 and CP2, and voltage dividing resistors RA, RB and RC. The window comparators C1 and C2 are provided to detect whether the current Im1 flows normally as set.

An application end of the reference voltage αVref is connected to one end of the voltage dividing resistor RA. The other end of the voltage dividing resistor RA is connected to one end of the voltage dividing resistor RB. The other end of the voltage dividing resistor RB is connected to one end of the voltage dividing resistor RC. The other end of the voltage dividing resistor RC is connected to the ground terminal.

The current detection voltage signal Vdet is applied to a non-inverting end (+) of the window comparator CP1. An inverting end (−) of the window comparator CP1 is connected to a node NA of the resistors RA and RB. A comparative reference voltage Vref_cp1 generated in the node NA is Vref_cp1=αVref×((RB+RC)/(RA+RB+RC)). The window comparator C1 compares the current detection signal Vdet with the comparative reference voltage Vref_cp1, and outputs a comparison result as a comparison output signal Cpout1.

The current detection voltage signal Vdet is applied to a non-inverting end (+) of the window comparator CP2. An inverting end (−) of the window comparator CP2 is connected to a node NB of the resistors RB and RC. A comparative reference voltage Vref_cp2 generated in the node NB is Vref_cp2=Vref_cp2=αVref×(RC/(RA+RB+RC)) That is to say, Vref_cp2<Vref_cp1 as a result. The window comparator C2 compares the current detection signal Vdet with the comparative reference voltage Vref_cp2, and outputs a comparison result as a comparison output signal Cpout2.

Herein, it is set that $$V\,\mathrm{det}=(((\alpha\mathrm{Vref}/R1)\times R2)/R)\times(M2/(M1+M2))\times R3=\alpha\mathrm{Vref}\times K$$

That is to say, the value of K is set through the values of R1, R2, R, M1, M2 and R3.

In addition, the voltage dividing resistors RA, RB and RC are set in a manner that Vref_cp1>αVref×K and Vref_cp2<αVref×K. Accordingly, it is detected that the current detection signal Vdet is more than Vef_cp2 and less than Vref_cp1 through the window comparators CP1 and CP2, and it is accordingly detected that the current detection signal Vdet is within a tolerable range and the current Im1 flows normally as set.

Figure 3:
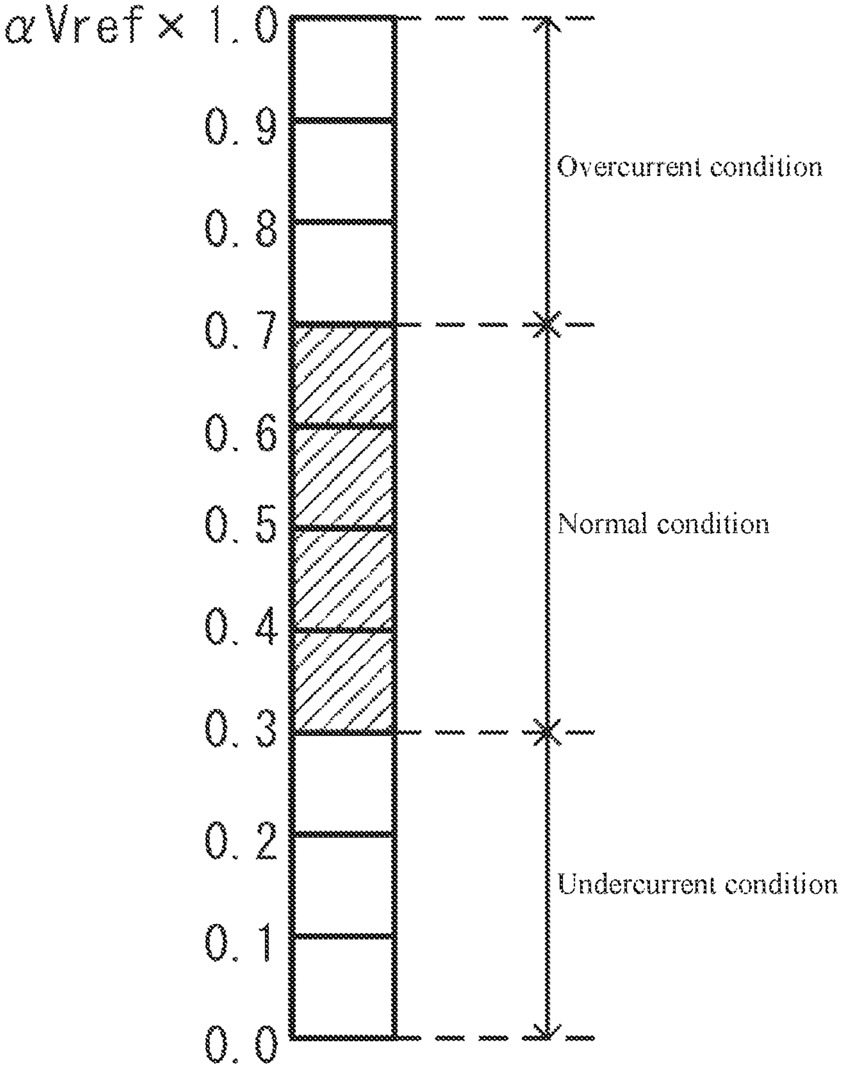
FIG. 3 is a diagram of an example of a state of detecting a current flowing through a constant current circuit.

Herein, as an example, a detection state of the current Im1 in which K=0.5, Vref_cp1=αVref×0.7, and ref_cp2=αVref×0.3 is shown in FIG. 3. As shown in FIG. 3, when αVref×0.3≤Vdet≤αVref×0.7, Vref is within a tolerable range and the current Im1 is in a normal condition.

On the other hand, when Vdet<αVref×0.3, the current Im1 is in an undercurrent condition. Such condition takes places in case of, for example, an open-circuit abnormality of LED terminals or a ground abnormality of LED terminals, when Ir=Im1=Im2=0.

On the other hand, when Vdet>αVref×0.7, the current Im1 is in an overcurrent condition. Such condition takes place in case of an abnormality in the drive amplifier 121A or the transistor M1 and hence an abnormality in the feedback voltage Vfb, or a short-circuit in the resistor R1 in the LED current setting unit 11 and hence an abnormality in the current set reference voltage VA.

Moreover, the value of K above is not limited to being 0.5, but it is expectantly set that K=0.5. As shown in FIG. 3, this is to ensure a range for abnormality detection for an undercurrent condition and an overcurrent condition.

Moreover, in the configuration in FIG. 2, the reference voltage αVref for generating the current set reference voltage VA and the reference voltage αVref for generating the comparative reference voltages Vref_cp1 and Vref_cp2 are common; however, the two may not be common. However, considering that an offset is generated in the reference voltage αVref, it is expected that the reference voltage αVref be common.

The comparison output signals Cpout1 and Cpout2 output from the window comparators CP1 and CP2 can be output to the protection circuit unit 10. In the protection circuit unit 10, in case that the LED open-circuit detection circuit (OPEN) and or the output grounding protection circuit (SCP) determines, based on the comparison output signals Cpout1 and Cpout2, that an abnormality of an undercurrent has occurred, and applies an open-circuit protection or a ground protection. Moreover, the protection circuit unit 10 can also apply a protection such as turning off the constant current circuit 121 of the corresponding system, in case of determining based on the comparison output signals Cpout1 and Cpout2 that an abnormality of an overcurrent has occurred.

Figure 4:
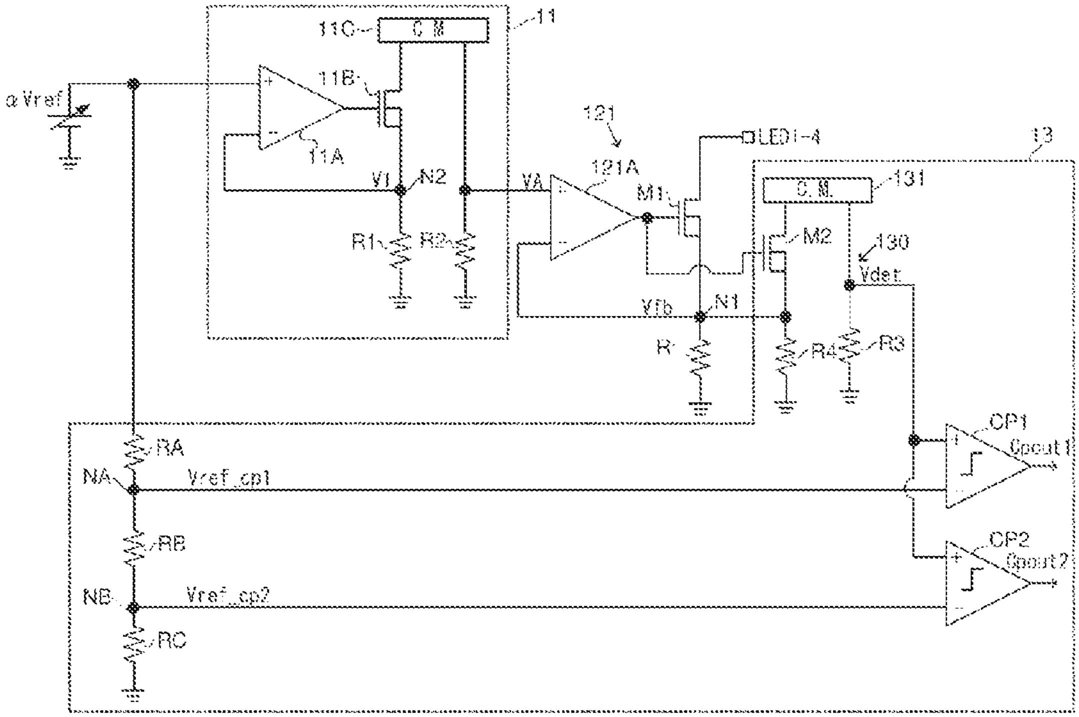
FIG. 4 is a diagram of a configuration including a current monitoring unit according to a variation example of the first embodiment.

FIG. 4 shows a diagram of a configuration including the current monitoring unit 13 according to a variation example of the first embodiment. The current monitoring unit 13 shown in FIG. 4 includes a resistor R4. The source of the transistor M2 is connected to one end of the resistor R4. The other end of the resistor R4 is connected to the ground terminal. If the value of the resistor R4 is designed to be far greater than the value of the current setting resistance R, the current Im1 can be detected through the current detection signal Vdet, as the first embodiment.

<4. Current Monitoring Unit of Second Embodiment>

Figure 5:
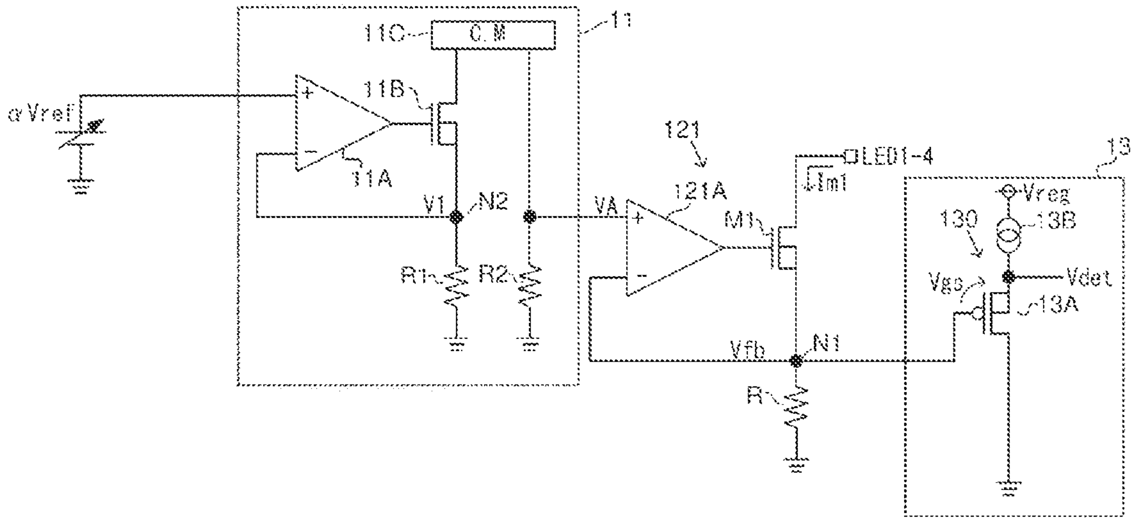
FIG. 5 is a circuit diagram of a configuration of a current monitoring unit according to a second embodiment.

FIG. 5 shows a diagram of the current monitoring unit 13 according to a second embodiment. The current monitoring unit 13 of the second embodiment shown in FIG. 5 includes a P-type metal-oxide-semiconductor (PMOS) transistor 13A and a constant current source 13B.

The gate of the PMOS transistor 13A is connected to the node N1 in the constant current circuit 121. The constant current source 13B is connected between the application end of the internal voltage Vref and the source of the PMOS transistor 13A. The drain of the PMOS transistor 13A is connected to the ground terminal.

With this configuration, the current detection signal Vdet generated in the source of the PMOS transistor 13A becomes Vdet=Vfb+Vgs. Wherein, Vgs is a gate/source voltage of the PMOS transistor 13A.

Because the current Im1 flowing through the transistor M1 is Im1=Vfb/R, the current Im1 can be directly monitored through the current detection signal Vdet. For a normal condition, Vdet=VA+Vgs=(αVref/R1)×R2+Vgs. In particular, with the current monitoring unit 13 of this embodiment, the number of elements used can be reduced.

<5. Current Monitoring Unit of Third Embodiment>

Figure 6:
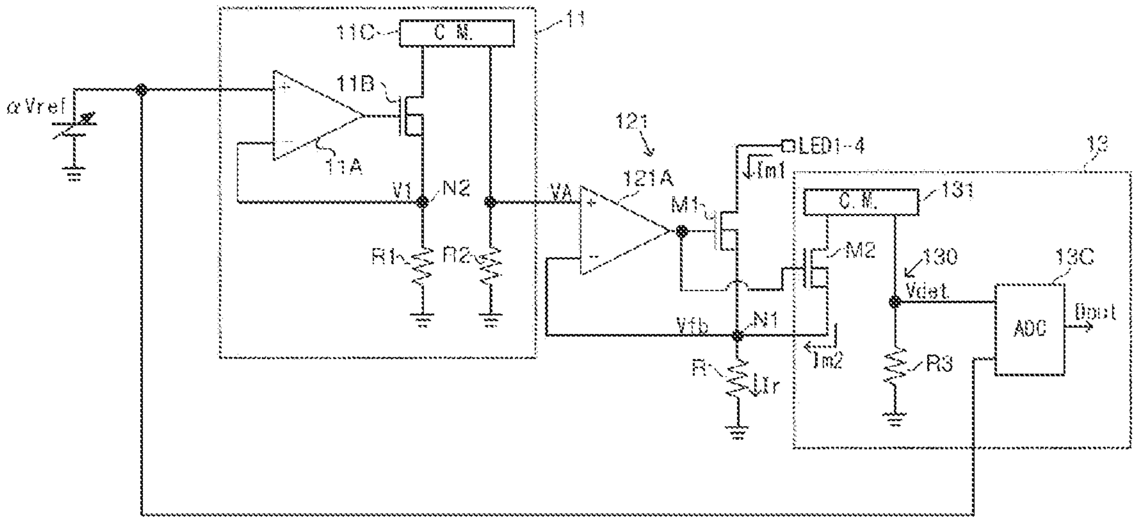
FIG. 6 is a circuit diagram of a configuration including a current monitoring unit according to a third embodiment.

FIG. 6 shows a diagram of the current monitoring unit 13 according to a third embodiment. In the current monitoring unit 13 of the third embodiment shown in FIG. 6, an analog-to-digital converter (ADC) 13C is used in substitution for the window comparators CP1 and CP2 in the first embodiment.

The ADC 13C is formed by a type such as flash or successive approximation. The current detection voltage signal Vdet is input to an analog input end of the ADC 13C. The reference voltage αVref is input to a reference voltage input end of the ADC 13C. The ADC 13C outputs the reference voltage αVref as the maximum digital value (with all bits being 1), and outputs the digital value of the current detection signal Vdet as the digital output Dout.

Accordingly, as described above, if it is set that Vdet=αVref×K (where K is, for example, 0.5) in a normal condition, the digital output Dout corresponding to the digital value of the reference voltage αVref×K is output by the ADC 13C.

With this embodiment, compared to the first embodiment using the window comparators CP1 and CP2, the current detection signal Vdet, that is, the condition of the current Im1, can be detected accurately.

<6. Other>

The exemplary embodiments are as described above; however, various modification may be made to the embodiments without departing from the scope of the subject matter of the present disclosure.

<7. Notes>

As described above, for example, a light emitting element driving device (20) of the present disclosure is configured to include: an external terminal (LED 1 to LED 4), configured to connect to a first terminal of a light emitting element (31 to 34); a constant current circuit (121), connected to the external terminal; and a current detection unit (130), configured to detect a current flowing through the constant current circuit; wherein, the constant current circuit includes: a first transistor (M1), including a first end, a second end and a control end connected to the external terminal; a current setting resistance (R), connected to the second end of the first transistor; and a drive amplifier (121A), including a first input end connected to a first node (N1) to which the first transistor and the current setting resistance are connected, a second input end to which a current set voltage (VA) is applied, and an output end connected to the control end of the first transistor; and the current detection unit converts the current flowing through the light emitting element into a voltage signal based on a feedback voltage (Vfb) generated in the first node, and generates a current detection signal (Vdet) (a first configuration).

In the first configuration, the current detection unit (130) includes: a second transistor (M2), including a control end connected to the output end of the drive amplifier (121A), a first end connected to the first node, and a second end; a first current mirror (131), including an input end and an output end connected to the second end of the second transistor; and an I-V conversion resistor (R3), connected to the output end of the first current mirror (a second configuration).

In the second configuration, a size of the second transistor (M2) is less than a size of the first transistor (M) (a third configuration).

In any of the first to third configurations, the current set voltage (VA) is generated based on a first reference voltage (αVref):

- the light emitting element driving device (20) includes window comparators (CP1 and CP2) that compare a comparative reference voltage (Vref_cp1, Vref_cp2) obtained by dividing a second reference voltage (αVref) with the current detection signal (Vdet)(a fourth configuration).

In the fourth configuration, the first reference voltage (αVref) and the second reference voltage (αVref) are common voltages (a fifth configuration).

In the fourth or fifth configuration, in a normal condition, Vdet=αVref×0.5, in which the current detection signal is Vdet and the first reference voltage is αVref (a sixth configuration).

In any of the first to third configurations, the current set voltage (VA) is generated based on a third reference voltage (αVref); the light emitting element driving device (20) includes an analog-to-digital converter (ADC) (13C) including an analog input end to which the current detection signal (Vdet) is input and a reference voltage input end to which a fourth reference voltage (αVref) is input (a seventh configuration).

In the seventh configuration, the third reference voltage (αVref) and the fourth reference voltage (αVref) are common voltages (an eighth configuration).

In the seventh or eighth configuration, in a normal condition, Vdet=αVref×0.5, in which the current detection signal is Vdet and the third reference voltage is αVref (a ninth configuration).

In the first configuration, the current detection unit (130) includes a PMOS transistor (13A) including a gate connected to the first node (N1) (a tenth configuration).

In any of the first to tenth configurations, the light emitting element driving device (20) includes a current setting unit (11) that generates the current set voltage (VA), and the current setting unit (11) includes: a third transistor (11B), including a control end, a first end, and a second end; an error amplifier (11A), including a first input end to which a reference voltage (αVref) is input, a second input end to which a voltage (V1) generated in a second node (N2) to which the first end of the third transistor and a first resistor (R1) are connected is input, and an output end connected to the control end of the third transistor; a second current mirror (11C), including an input end and an output end connected to the second end of the third transistor; and a second resistor (R2), connected to the output end of the second current mirror (an eleventh configuration).

In the eleventh configuration, the reference voltage (αVref) is variable (a twelfth configuration).

Any of the first to twelfth configurations, further comprising: a DC/DC controller (201), controlling a generation of an output voltage (Vout) supplied to the second terminal of the light emitting element (31 to 34) based on a voltage of the external terminal (LED1 to LED4); and a protection circuit unit (10), performing a protection by detecting at least one of an open circuit abnormality of the external terminal and a ground abnormality of the external terminal based on the current detection signal (Vdet) and the output voltage (a thirteenth configuration).

INDUSTRIAL APPLICABILITY

The present disclosure is applicable to an LED driving method for various uses.

The invention claimed is:

1. A light emitting element driving device, comprising:
- an external terminal, configured to connect to a first terminal of a light emitting element;
- a constant current circuit, connected to the external terminal; and
- a current detection unit, configured to detect a current flowing through the constant current circuit, wherein
- the current detection unit includes:
  - a first transistor, including a first end, a second end and a control end connected to the external terminal;
  - a current setting resistance, connected to the second end of the first transistor; and
  - a drive amplifier, including:
    - a first input end, connected to a first node to which the first transistor and the current setting resistance are connected;
    - a second input end, to which a current set voltage is applied; and
    - an output end, connected to the control end of the first transistor, and wherein
- the current detection unit converts the current flowing through the light emitting element into a voltage signal based on a feedback voltage generated in the first node, and generates a current detection signal.

2. The light emitting element driving device of claim 1, wherein the current detection unit includes:
- a second transistor, including:
  - a control end, connected to the output end of the drive amplifier;
  - a first end, connected to the first node; and
  - a second end,
- a first current mirror, including an input end and an output end connected to the second end of the second transistor; and
- an I-V conversion resistor, connected to the output end of the first current mirror.

3. The light emitting element driving device of claim 2, wherein a size of the second transistor is less than a size of the first transistor.

4. The light emitting element driving device of claim 1, wherein the current set voltage is generated based on a first reference voltage, and the light emitting element driving device includes window comparators that compare a comparative reference voltage obtained by dividing a second reference voltage with the current detection signal.

5. The light emitting element driving device of claim 2, wherein the current set voltage is generated based on a first reference voltage, and the light emitting element driving device includes window comparators that compare a comparative reference voltage obtained by dividing a second reference voltage with the current detection signal.

6. The light emitting element driving device of claim 3, wherein the current set voltage is generated based on a first reference voltage, and the light emitting element driving device includes window comparators that compare a comparative reference voltage obtained by dividing a second reference voltage with the current detection signal.

7. The light emitting element driving device of claim 4, wherein the first reference voltage and the second reference voltage are common voltages.

8. The light emitting element driving device of claim 4, wherein in a normal condition, $Vdet = \alpha Vref \times 0.5$, in which the current detection signal is Vdet and the first reference voltage is $\alpha Vref$.

9. The light emitting element driving device of claim 7, wherein in a normal condition, $Vdet = \alpha Vref \times 0.5$, in which the current detection signal is Vdet and the first reference voltage is $\alpha Vref$.

10. The light emitting element driving device of claim 1, wherein the current set voltage is generated based on a third reference voltage, and the light emitting element driving device includes an A/D converter including an analog input end to which the current detection signal is input and a reference voltage input end to which a fourth reference voltage is input.

11. The light emitting element driving device of claim 2, wherein the current set voltage is generated based on a third reference voltage, and the light emitting element driving device includes an A/D converter including an analog input end to which the current detection signal is input and a reference voltage input end to which a fourth reference voltage is input.

12. The light emitting element driving device of claim 10, wherein the third reference voltage and the fourth reference voltage are common voltages.

13. The light emitting element driving device of claim 10, wherein in a normal condition, $Vdet = \alpha Vref \times 0.5$, in which the current detection signal is Vdet and the third reference voltage is $\alpha Vref$.

14. The light emitting element driving device of claim 12, wherein in a normal condition, $Vdet = \alpha Vref \times 0.5$, in which the current detection signal is Vdet and the third reference voltage is $\alpha Vref$.

15. The light emitting element driving device of claim 1, wherein the current detection unit includes a PMOS transistor including a gate connected to the first node.

16. The light emitting element driving device of claim 1, wherein the light emitting element driving device includes a current setting unit that generates the current set voltage, and the current setting unit includes:

a third transistor, including a control end, a first end, and a second end;

an error amplifier, including:

a first input end, to which a reference voltage is input;

a second input end, to which a voltage generated in a second node to which the first end of the third transistor and a first resistor are connected is input; and an output end, connected to the control end of the third transistor a second current mirror, including an input end and an output end connected to the second end of the third transistor; and a second resistor, connected to the output end of the second current mirror.

17. The light emitting element driving device of claim 2, wherein the light emitting element driving device includes a current setting unit that generates the current set voltage, and the current setting unit includes:

a third transistor, including a control end, a first end, and a second end;

an error amplifier, including:

a first input end, to which a reference voltage is input;

a second input end, to which a voltage generated in a second node to which the first end of the third transistor and a first resistor are connected is input; and an output end, connected to the control end of the third transistor a second current mirror, including an input end and an output end connected to the second end of the third transistor; and a second resistor, connected to the output end of the second current mirror.

18. The light emitting element driving device of claim 16, wherein the reference voltage is variable.

19. The light emitting element driving device of claim 1, further comprising:

a DC/DC controller, controlling a generation of an output voltage supplied to the second terminal of the light emitting element based on a voltage of the external terminal; and a protection circuit unit, performing a protection by detecting at least one of an open circuit abnormality of the external terminal and a ground abnormality of the external terminal based on the current detection signal and the output voltage.

20. The light emitting element driving device of claim 2, further comprising:

a DC/DC controller, controlling a generation of an output voltage supplied to the second terminal of the light emitting element based on a voltage of the external terminal; and a protection circuit unit, performing a protection by detecting at least one of an open circuit abnormality of the external terminal and a ground abnormality of the external terminal based on the current detection signal and the output voltage.

* * * * *